United States Patent [19]

Threlkeld

[11] Patent Number: 4,879,833
[45] Date of Patent: Nov. 14, 1989

[54] SHARK DIVERTING APPARATUS

[76] Inventor: Trina A. Threlkeld, 18406 Avenida Bonita, Sonora, Calif. 95370

[21] Appl. No.: 255,951

[22] Filed: Oct. 11, 1988

[51] Int. Cl.$^4$ .................................................. A01K 97/00
[52] U.S. Cl. .................................... 43/26.1; 43/17.1; 43/17.5; 446/162
[58] Field of Search ............... 43/26.1, 26.2, 17.1, 43/17.6, 17.5, 2; 446/161, 162, 163, 165

[56] References Cited

U.S. PATENT DOCUMENTS

| | | | |
|---|---|---|---|
| 51,120 | 11/1865 | Quinby | 43/17.5 |
| 2,612,861 | 10/1952 | Burkey | 43/17.5 |
| 2,624,975 | 1/1953 | Belding | 446/163 |
| 2,784,399 | 3/1957 | Smith | 43/17.1 |
| 2,955,375 | 10/1960 | Mitchell | 43/26.2 |
| 3,036,403 | 5/1962 | Presnell | 43/26.1 |
| 3,317,889 | 5/1967 | Barrand | 43/17.1 |
| 3,683,280 | 8/1972 | Holt | 43/17.1 |
| 3,683,356 | 8/1972 | D'Amore | 43/17.1 |
| 4,656,770 | 4/1987 | Nuttle | 43/2 |

*Primary Examiner*—Gene P. Crosby
*Attorney, Agent, or Firm*—Leon Gilden

[57] ABSTRACT

A shark diverting apparatus is set forth wherein a self-propelled torpedo-like device is arranged with a self-contained power source including a signal generator for generating a signal for attracting sharks. A flotation collar is fixedly secured about a central diameter of the torpedo-like body and includes a self-inflating canister and a manually operable stem for inflating the collar to a larger size. An included value slowly releases air pressure from within the collar during the travel of the device wherein subsequent to a timer circuit activation, a signal generator is activated for attracting sharks while simultaneously air pressure is released from the flotation collar to draw sharks away from and below an individual.

9 Claims, 1 Drawing Sheet

SHARK DIVERTING APPARATUS

BACKGROUND OF THE INVENTION

1. Field of the Invention

The field of invention relates to shark repelling and attracting apparatus, and more particularly pertains to a new and improved shark diverting apparatus to effectively divert sharks away from an individual in shark infested waters.

2. Description of the Prior Art

The use of various fish and shark repelling apparatus is well known in the prior art. Typically the devices are relatively stationary and at most, only enable a device to traverse the surface of a body of water, as opposed to the instant invention that includes a self-propelled body housing a signal generator for diverting sharks from an individual.

Examples of prior art devices include: U.S. Pat. No. 3,683,356 to D'Amore incorporated herein by reference to a fish calling signal generator utilizing a signal and illumination generation apparatus for attracting of fish and the like.

U.S. Pat. No. 2,612,861 to Burkey sets forth a fish diverting apparatus including a plurality of light producing elements on a supporting means and extending generally in a straight line with securement means interconnecting with the light producing means to effect a unit directional movement of light along a straight line for diverting fish.

U.S. Pat. No. 3,683,280 to Holt sets forth a shark repelling device utilizing a pulse generator producing an electrical field to divert sharks from proximity of the generating apparatus.

U.S. Pat. No. 3,317,889 to Barrand is similar in intent to the Holt patent utilizing a flotation device with a single generator housed therein producing a signal to deter sharks from an area proximate to the generation of the signal.

U.S. Pat. No. 4,656,770 to Nuttle sets forth a bird repelling apparatus utilizing a combination of visual and aural devices to impart panic to particular bird species.

As such, it may be appreciated that there is a continuing need for a shark diverting apparatus wherein the same may be readily and effectively utilized to traverse a length and depth of water to divert a shark from an individual.

SUMMARY OF THE INVENTION

In view of the foregoing disadvantages inherent in the known types of fish diverting apparatus now present in the prior art, the present invention provides a shark diverting apparatus wherein the same includes a self-propelled body to distract a potential attacking shark to a position remote from and below an individual. As such, the general purpose of the present invention, which will be described subsequently in greater detail, is to provide a new and improved shark diverting apparatus which has all the advantages of the prior art shark diverting apparatus and none of the disadvantages.

To attain this, the present invention comprises an elongate torpedo-like body including directional fins housing a motor for effecting movement to said device through the water, a signal generator to actuate upon a lapse of a predetermined timing event, and a flotation collar that may be orally inflated or inflated through the use of an associated pressurized container. The flotation device includes a valve for slowly releasing air pressure from about said collar to enable said device to gradually dive during its traverse through the water to attract a potential attacking shark to a point remote from an individual.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shark diverting apparatus which has all the advantages of the prior art shark diverting apparatus and none of the disadvantages.

It is another object of the present invention to provide a new and improved shark diverting apparatus which may be easily and efficiently manufactured and marketed.

It is a further object of the present invention to provide a new and improved shark diverting apparatus which is of a durable and reliable construction.

An even further object of the present invention is to provide a new and improved shark diverting apparatus which is susceptible of a low cost of manufacture with regard to both materials and labor, and which accordingly is then susceptible of low prices of sale to the consuming public, thereby making such shark diverting apparatus economically available to the buying public.

Still yet another object of the present invention is to provide a new and improved shark diverting apparatus which provides in the apparatuses and methods of the prior art some of the advantages thereof, while simultaneously overcoming some of the disadvantages normally associated therewith.

Still another object of the present invention is to provide a new and improved shark diverting apparatus wherein an elongate body includes a self-contained motivating and diving apparatus as well as a signal generating device to attract sharks to a position remote from point of origin.

These together with other objects of the invention, along with the various features of novelty which characterize the invention, are pointed out with particularity in the claims annexed to and forming a part of this disclosure. For a better understanding of the invention, its operating advantages and the specific objects attained by its use, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
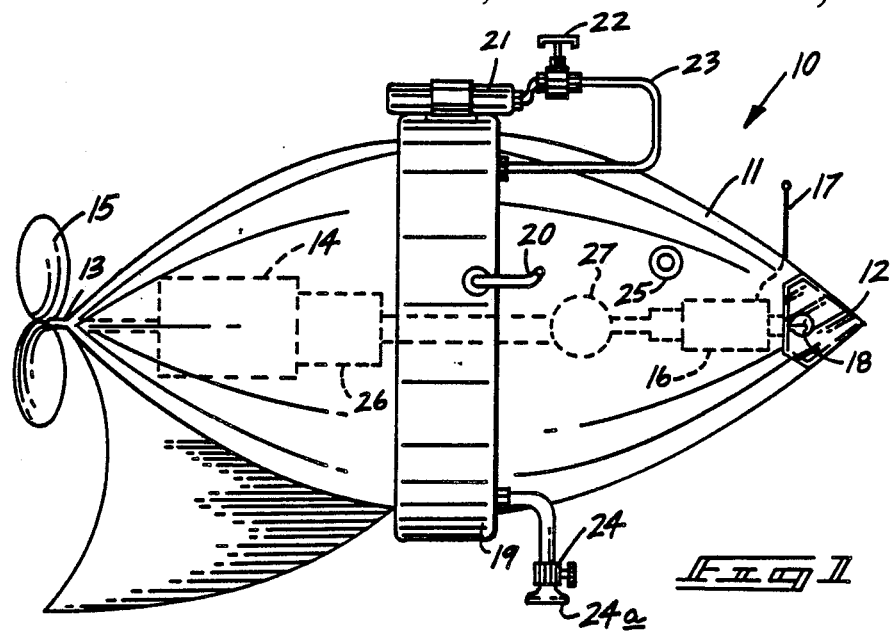
FIG. 1 is an orthographic view taken in elevation of the instant invention.

With reference now to the drawings, and in particular to FIGS. 1 to 4 thereof, a new and improved shark diverting apparatus embodying the principles and concepts of the present invention and generally designated by the reference numeral 10 will be described.

More specifically, it will be noted that the shark diverting apparatus 10 essentially comprises a torpedo-like body 11 of a generally ellipsoidal longitudinal configuration formed of typical circular cross-sectional configurations taken in section orthogonal to the longitudinal axis of the body 11. This particular shape enhances the movement of the apparatus 10 through a body of water. The forwardmost portion of the body 11 is formed with a transparent forward nose 12 housing an illumination bulb 18. A rearwardmost terminal end of the body 11 includes a rearwardly extending driven shaft 13 driven by an included motor 14 housed within the body 11 and terminating with a propeller 15. A forward portion of the body 11 proximate the transparent forward nose 12 houses a signal generator 16 of a type as set forth in U.S. Pat. No. 3,683,356 incorporated herein by reference. An antennae 17 projects outwardly of the body 11 for enhancement of transmission signals.

A flotation collar 19 surroundingly encompasses a medial circumferential exterior portion of the body 11. The flotation collar 19 is formed with an oral valve 20 to enable oral pressurization of the flotation collar 19 formed as a cell of air-tight construction. Furthermore, a compressed gas cylinder 21 overlies a top portion of the body 11 to align and distribute the weight of the cylinder 21 in conjunction with the alignment of the rearwardly mounted motor 14 and the forwardly mounted signal generator 16.

Figure 4:
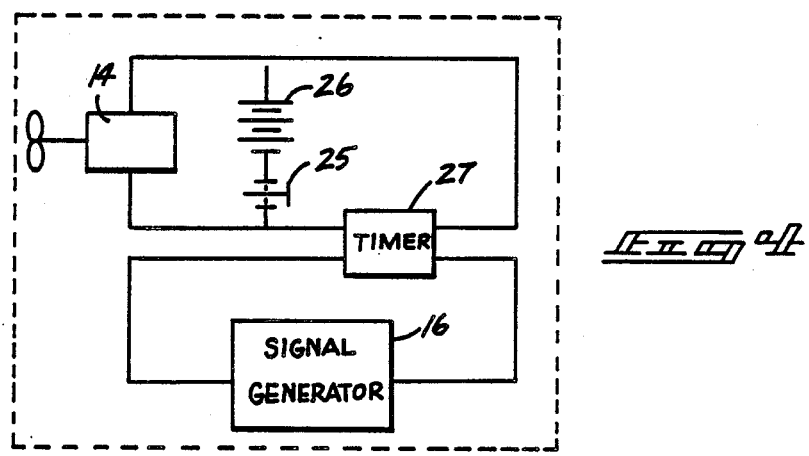
FIG. 4 is a diagrammatic illustration of an electrical circuit associated with the instant invention.
Figure 2:
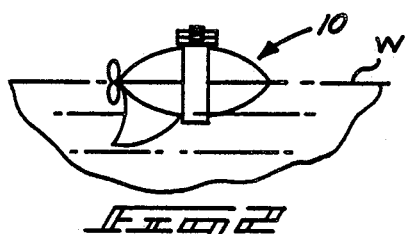
FIG. 2 is a diagrammatic illustration of a point of origin reference of said invention initiating its traverse through a body of water.
Figure 3:
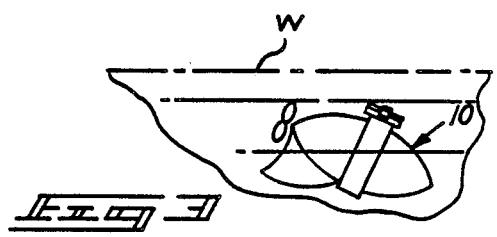
FIG. 3 is a diagrammatic representation illustrating the instant invention in a subsequent diving mode relative to a point of origin.

In use, the valve 22 is opened whereupon compressed gas from the cylinder 21 is directed interiorly of the flotation collar 19. Should the gas cylinder 21 or valve 22 fail, the oral valve 20 may be utilized whereupon an individual may inflate the flotation collar 19 to increase it size. It should be noted that the conduit 23 directing pressurized gas from cylinder 21 into the flotation collar 19 is of rigid construction to maintain alignment of the cylinder 21 and rigidity of the organization associated therewith. A release valve 24 is positioned at a lowermost portion of the flotation collar 19, again for weight distribution to counterbalance the gas cylinder organization 21 and utilizes a slow release head 24a that allows pressurized gas interiorly of the collar 19 to slowly escape. In this vein, reference to FIGS. 2 and 3 illustrate the disposition of the apparatus 10 during its traverse over the surface of water "W", whereupon FIG. 3 illustrates the slow release of gas within its inflated collar 19 to reduce its size, allows the device 10 to sink and further direct a non-desirable shark at a remote point relative to an individual. Reference to FIG. 4 diagrammatically illustrates the interrelationship of the various components wherein subsequent to the inflation of the collar 19, the waterproof switch 25 is depressed whereupon a battery pack 26 associated electrically with the various components supplies power to the motor 14 to actuate the propeller 15 and motivate the device through the water. A timer 27 inter-relates the aforenoted circuit with a secondary circuit associated with a signal generator whereupon the elapse of a predetermined time sequence, power is provided to the signal generator 16 to emit signals and effect a flashing of the bulb 18 to attract sharks. The timer circuit enables the device to have traversed a significant distance from a user and during the operation of the signal generator, the device 10 will be in a dive mode, as illustrated in FIG. 3, to further remotely orient the apparatus relative to a user.

As to the manner of usage and operation of the instant invention, the same should be apparent from the above description and accordingly no further discussion relative to the manner of usage and operation shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A shark diverting apparatus for decoying sharks remote from a point of origin in travel of the apparatus through a water medium wherein said apparatus comprises,
    an elongate body formed with a flotation collar surroundingly encompassing a circumference of said body, and
    inflation means for selectively inflating said collar to enlarge its size, and
    deflation means for slowly deflating said collar to decrease its size, and motor means for providing power to direct said body through said water medium, and a signal generator to provide a shark attracting signal.

2. A shark diverting apparatus as set forth in claim 1 wherein said elongate body includes a battery pack to power said motor means, and wherein said motor includes a shaft rearwardly directed of said body with a propeller integrally secured to a terminal end of said shaft.

3. A shark diverting apparatus as set forth in claim 2 wherein a timer mechanism is electronically secured between said battery pack and said signal generator to actuate said signal generator subsequent to an elapsed predetermined period of time.

4. A shark diverting apparatus as set forth in claim 3 wherein said body includes a waterproof switch to energize said motor means and said timer mechanism.

5. A shark diverting apparatus as set forth in claim 4 wherein said inflation means includes a compressed gas cylinder with a valve secured thereto for selectively directing pressurized gas into said flotation collar.

6. A shark diverting apparatus as set forth in claim 5 wherein said inflation means further includes an oral valve wherein an individual may inflate said flotation collar orally.

7. A shark diverting apparatus as set forth in claim 6 wherein said deflation means includes a release valve manually operable to allow a slow release of gas from within said flotation collar relative to the inflation rate of gas provided into the interior of said collar.

8. A shark diverting apparatus as set forth in claim 7 wherein a forward terminal end of said body includes a transparent nose encompassing an illumination bulb for providing illumination and generation of a shark attracting signal from said signal generator.

9. A shark diverting apparatus as set forth in claim 8 wherein said body further includes a fin integrally secured to said body for directing said body through said water medium away from a user.

* * * * *